United States Patent
Sloane et al.

(10) Patent No.: US 11,163,889 B2
(45) Date of Patent: Nov. 2, 2021

(54) SYSTEM AND METHOD FOR ANALYZING AND REMEDIATING COMPUTER APPLICATION VULNERABILITIES VIA MULTIDIMENSIONAL CORRELATION AND PRIORITIZATION

(71) Applicant: Bank of America Corporation, Charlotte, NC (US)

(72) Inventors: Brandon Sloane, Santa Barbara, CA (US); Brian Diederich, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 284 days.

(21) Appl. No.: 16/441,718

(22) Filed: Jun. 14, 2019

(65) Prior Publication Data

US 2020/0394310 A1 Dec. 17, 2020

(51) Int. Cl.
| | |
|---|---|
| *G06F 21/57* | (2013.01) |
| *G06F 8/65* | (2018.01) |
| *G06N 3/04* | (2006.01) |
| *G06F 16/901* | (2019.01) |
| *G06N 3/08* | (2006.01) |

(52) U.S. Cl.
CPC .............. *G06F 21/577* (2013.01); *G06F 8/65* (2013.01); *G06F 16/9024* (2019.01); *G06N 3/04* (2013.01); *G06N 3/08* (2013.01); *G06F 2221/033* (2013.01)

(58) Field of Classification Search
CPC ...... G06F 21/577; G06F 16/9024; G06F 8/65; G06F 2221/033; G06N 3/04; G06N 3/08

USPC ..................................................... 726/22–25
See application file for complete search history.

(56) References Cited

U.S. PATENT DOCUMENTS

| | | | |
|---|---|---|---|
| 573,036 A | 12/1896 | Piaget | |
| 6,282,546 B1 * | 8/2001 | Gleichauf | ............. G06F 21/604 |
| | | | 726/25 |
| 7,278,163 B2 | 10/2007 | Banzhof et al. | |
| 8,132,260 B1 | 3/2012 | Mayer et al. | |
| 8,176,561 B1 | 5/2012 | Hurst et al. | |
| 8,201,257 B1 | 6/2012 | Andres et al. | |
| 8,356,001 B2 | 1/2013 | Collazo | |

(Continued)

FOREIGN PATENT DOCUMENTS

| | | |
|---|---|---|
| SG | 11201900752 P | 2/2019 |
| TW | I573036 B | 3/2017 |

*Primary Examiner* — Noura Zoubair
*Assistant Examiner* — Mahabub S Ahmed
(74) *Attorney, Agent, or Firm* — Michael A. Springs; Moore & Van Allen PLLC; Seongun M. Hong

(57) ABSTRACT

A system provides analysis of computer application vulnerabilities via multidimensional correlation and prioritization. The system may begin by generating a data repository of each application within a computing environment. Once the data repository is generated, the system may assess the dependencies, relationships, and vulnerabilities of the applications and processes used within the system. The system may perform assessments across multiple dimensions and/or metrics (e.g., impacts on users, devices, networks, applications, and/or data). Based on performing said assessments, the system may calculate relatedness and/or dependency scores across the dimensions or metrics, where the scores may be used to generate a prioritization scheme for making changes to application code or applying updates.

18 Claims, 2 Drawing Sheets

(56) References Cited

U.S. PATENT DOCUMENTS

| | | | |
|---|---|---|---|
| 8,789,192 B2* | 7/2014 | LaBumbard | G06F 21/577 726/25 |
| 8,850,588 B2 | 9/2014 | Kumar et al. | |
| 8,856,936 B2 | 10/2014 | Datta Ray et al. | |
| 8,881,288 B1* | 11/2014 | Levy | H04L 63/1408 726/25 |
| 8,949,169 B2* | 2/2015 | Shelton | H04L 63/20 706/47 |
| 8,949,674 B2* | 2/2015 | Mancoridis | G06F 11/3612 714/38.1 |
| 9,210,185 B1* | 12/2015 | Pinney Wood | G06F 21/577 |
| 9,342,690 B2* | 5/2016 | Lietz | G06F 21/577 |
| 9,383,970 B2* | 7/2016 | Joy | G06F 8/20 |
| 9,692,778 B1 | 6/2017 | Mohanty | |
| 9,794,279 B2 | 10/2017 | DiValentin et al. | |
| 9,800,605 B2* | 10/2017 | Baikalov | H04L 63/1408 |
| 9,990,499 B2* | 6/2018 | Chan | G06F 21/577 |
| 10,210,470 B2 | 2/2019 | Datta Ray | |
| 10,262,145 B2* | 4/2019 | Hoernecke | G06F 21/577 |
| 10,474,827 B2* | 11/2019 | Zhu | G06Q 50/01 |
| 10,691,810 B1* | 6/2020 | Freitag | G06F 21/577 |
| 10,810,106 B1* | 10/2020 | Amit | G06F 11/3604 |
| 2008/0209567 A1* | 8/2008 | Lockhart | G06F 21/577 726/25 |
| 2010/0153156 A1* | 6/2010 | Guinta | G06Q 10/0635 705/7.28 |
| 2011/0277034 A1* | 11/2011 | Hanson | H04L 63/1433 726/25 |
| 2012/0072968 A1* | 3/2012 | Wysopal | G06F 11/3612 726/1 |
| 2012/0216243 A1* | 8/2012 | Gill | G06Q 10/063 726/1 |
| 2013/0298230 A1* | 11/2013 | Kumar | H04L 63/1425 726/22 |
| 2014/0019490 A1* | 1/2014 | Roy | G06F 16/2228 707/798 |
| 2014/0059690 A1* | 2/2014 | Li | G06F 21/562 726/25 |
| 2014/0075560 A1* | 3/2014 | Guy | G06F 21/577 726/25 |
| 2014/0283083 A1* | 9/2014 | Gula | H04L 63/1433 726/25 |
| 2014/0366143 A1* | 12/2014 | Sandler | G06F 21/51 726/25 |
| 2015/0049634 A1* | 2/2015 | Levchuk | G06Q 50/01 370/254 |
| 2015/0128274 A1 | 5/2015 | Giokas | |
| 2015/0143524 A1* | 5/2015 | Chestna | G06F 21/53 726/25 |
| 2015/0242637 A1* | 8/2015 | Tonn | H04L 63/1433 726/25 |
| 2015/0310188 A1* | 10/2015 | Ford | H04L 63/0428 726/28 |
| 2015/0347759 A1* | 12/2015 | Cabrera | H04L 63/1433 726/25 |
| 2015/0365437 A1* | 12/2015 | Bell, Jr. | H04L 63/20 726/1 |
| 2016/0099953 A1* | 4/2016 | Hebert | H04L 63/1433 726/23 |
| 2016/0099963 A1* | 4/2016 | Mahaffey | H04W 12/12 726/25 |
| 2016/0134653 A1* | 5/2016 | Vallone | H04L 41/046 726/25 |
| 2016/0164905 A1* | 6/2016 | Pinney Wood | G06F 21/577 726/25 |
| 2016/0203575 A1* | 7/2016 | Madhu | G06Q 50/01 705/319 |
| 2017/0034023 A1* | 2/2017 | Nickolov | H04L 43/0817 |
| 2017/0041296 A1* | 2/2017 | Ford | G06F 16/951 |
| 2017/0061348 A1* | 3/2017 | Mack | G06Q 10/06313 |
| 2017/0098086 A1* | 4/2017 | Hoernecke | G06Q 10/0635 |
| 2017/0126712 A1 | 5/2017 | Crabtree et al. | |
| 2017/0169229 A1* | 6/2017 | Brucker | G06F 21/566 |
| 2017/0169230 A1* | 6/2017 | Zheng | G06F 21/577 |
| 2017/0308621 A1* | 10/2017 | Wu | G06F 16/9024 |
| 2017/0323463 A1* | 11/2017 | Leiba | G06F 16/22 |
| 2018/0032736 A1* | 2/2018 | Inagaki | G06Q 10/0635 |
| 2018/0137288 A1* | 5/2018 | Polyakov | G06F 21/577 |
| 2018/0157842 A1* | 6/2018 | Holz | G06F 21/577 |
| 2018/0189497 A1* | 7/2018 | Sukhomlinov | G06F 21/50 |
| 2018/0248902 A1* | 8/2018 | D Nil-Dumitrescu | G06N 3/02 |
| 2018/0351987 A1* | 12/2018 | Patel | G06F 21/577 |
| 2019/0028557 A1* | 1/2019 | Modi | H04L 67/22 |
| 2019/0108342 A1* | 4/2019 | Conikee | G06F 21/554 |
| 2019/0141079 A1* | 5/2019 | Vidas | H04L 63/20 |
| 2019/0205542 A1* | 7/2019 | Kao | G06Q 10/0635 |
| 2019/0260795 A1* | 8/2019 | Araiza | H04L 63/101 |
| 2019/0294461 A1* | 9/2019 | Woods | G06F 16/14 |
| 2020/0026580 A1* | 1/2020 | Bahramshahry | G06F 9/4881 |
| 2020/0067962 A1* | 2/2020 | Tan | G06F 16/2455 |
| 2020/0159525 A1* | 5/2020 | Bhalla | G06Q 10/06313 |
| 2020/0162497 A1* | 5/2020 | Iyer | H04L 63/1433 |
| 2020/0202006 A1* | 6/2020 | Shah | G06F 8/71 |
| 2020/0285752 A1* | 9/2020 | Wyatt | G06F 21/577 |
| 2020/0287793 A1* | 9/2020 | Buck | G06F 21/577 |
| 2020/0342116 A1* | 10/2020 | Agarwal | G06F 17/15 |
| 2020/0351345 A1* | 11/2020 | Bansod | H04L 67/34 |
| 2021/0021644 A1* | 1/2021 | Crabtree | H04L 63/1441 |

* cited by examiner

SYSTEM AND METHOD FOR ANALYZING AND REMEDIATING COMPUTER APPLICATION VULNERABILITIES VIA MULTIDIMENSIONAL CORRELATION AND PRIORITIZATION

FIELD OF THE INVENTION

The present disclosure embraces a system for analyzing and remediating computer application vulnerabilities via multidimensional correlation and prioritization. In particular, the system may analyze application interdependencies along multiple different metrics to determine the impact of changes made to the applications within the computing network.

BACKGROUND

Conventional methods for updating or patching software applications may lack the granularity needed to identify the impact of software code updates on each application within a computing environment. Accordingly, there is a need for a deeper and more accurate way to perform application tiering and prioritization.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for analyzing computer application vulnerabilities via multidimensional correlation and prioritization. The system may begin by generating a data repository of each application within a computing environment. Once the data repository is generated, the system may assess the dependencies, relationships, and vulnerabilities of the applications and processes used within the system. The system may perform assessments across multiple dimensions and/or metrics (e.g., impacts on users, devices, networks, applications, and/or data). Based on performing said assessments, the system may calculate relatedness and/or dependency scores across the dimensions or metrics, where the scores may be used to generate a prioritization scheme for making changes to application code or applying updates.

According, embodiments of the present disclosure provide a system for analyzing and remediating computer application vulnerabilities via multidimensional correlation and prioritization. The system may comprise a memory device with computer-readable program code stored thereon; a communication device; and a processing device operatively coupled to the memory device and the communication device. The processing device may be configured to execute the computer-readable program code to retrieve data and metadata associated with one or more target applications; generate a data repository comprising the data and metadata associated with the one or more target applications; calculate vulnerability scores for each of the one or more target applications; based on the vulnerability scores, calculate interdependency scores for one or more relationships between the one or more target applications; based on the vulnerability scores and the interdependency scores, generate a prioritization scheme for updating the one or more target applications; and update the one or more target applications according to the prioritization scheme.

In some embodiments, the data repository comprises a graph database, wherein the one or more target applications are stored as vertices, wherein the one or more relationships are stored as edges.

In some embodiments, calculating interdependency scores comprises assessing the one or more relationships along a set of predefined dimensions.

In some embodiments, the set of predefined dimensions comprises measures of impacts to users, data, devices, software, and networks.

In some embodiments, the computer-readable program code further causes the processing device to continuously monitor, via a neural network, historical data of outcomes of updating the one or more target applications according to the prioritization scheme; compare the historical data of outcomes with predicted outcomes; and output one or more recommendations to modify the prioritization scheme.

In some embodiments, the one or more recommendations to modify the prioritization scheme comprise changes to impact definitions, changes to the vulnerability scores or the interdependency scores, or newly suggested relationships between applications.

In some embodiments, the prioritization scheme comprises an order in which the one or more target applications will be updated.

Embodiments of the present disclosure also provide a computer program product for analyzing and remediating computer application vulnerabilities via multidimensional correlation and prioritization. The computer program product may comprise at least one non-transitory computer readable medium having computer-readable program code portions embodied therein, the computer-readable program code portions comprising executable code portions for retrieving data and metadata associated with one or more target applications; generating a data repository comprising the data and metadata associated with the one or more target applications; calculating vulnerability scores for each of the one or more target applications; based on the vulnerability scores, calculating interdependency scores for one or more relationships between the one or more target applications; based on the vulnerability scores and the interdependency scores, generating a prioritization scheme for updating the one or more target applications; and updating the one or more target applications according to the prioritization scheme.

In some embodiments, the data repository comprises a graph database, wherein the one or more target applications are stored as vertices, wherein the one or more relationships are stored as edges.

In some embodiments, calculating interdependency scores comprises assessing the one or more relationships along a set of predefined dimensions.

In some embodiments, the set of predefined dimensions comprises measures of impacts to users, data, devices, software, and networks.

In some embodiments, the computer-readable program code portions further comprise executable code portions for continuously monitoring, via a neural network, historical data of outcomes of updating the one or more target applications according to the prioritization scheme; comparing the historical data of outcomes with predicted outcomes; and outputting one or more recommendations to modify the prioritization scheme.

In some embodiments, the one or more recommendations to modify the prioritization scheme comprise changes to impact definitions, changes to the vulnerability scores or the interdependency scores, or newly suggested relationships between applications.

Embodiments of the present disclosure also provide a computer-implemented method for analyzing and remediating computer application vulnerabilities via multidimensional correlation and prioritization. The method may comprise retrieving data and metadata associated with one or more target applications; generating a data repository comprising the data and metadata associated with the one or more target applications; calculating vulnerability scores for each of the one or more target applications; based on the vulnerability scores, calculating interdependency scores for one or more relationships between the one or more target applications; based on the vulnerability scores and the interdependency scores, generating a prioritization scheme for updating the one or more target applications; and updating the one or more target applications according to the prioritization scheme.

In some embodiments, the data repository comprises a graph database, wherein the one or more target applications are stored as vertices, wherein the one or more relationships are stored as edges.

In some embodiments, calculating interdependency scores comprises assessing the one or more relationships along a set of predefined dimensions.

In some embodiments, the set of predefined dimensions comprises measures of impacts to users, data, devices, software, and networks.

In some embodiments, the method further comprises continuously monitoring, via a neural network, historical data of outcomes of updating the one or more target applications according to the prioritization scheme; comparing the historical data of outcomes with predicted outcomes; and outputting one or more recommendations to modify the prioritization scheme.

In some embodiments, the one or more recommendations to modify the prioritization scheme comprise changes to impact definitions, changes to the vulnerability scores or the interdependency scores, or newly suggested relationships between applications.

In some embodiments, the prioritization scheme comprises an order in which the one or more target applications will be updated.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
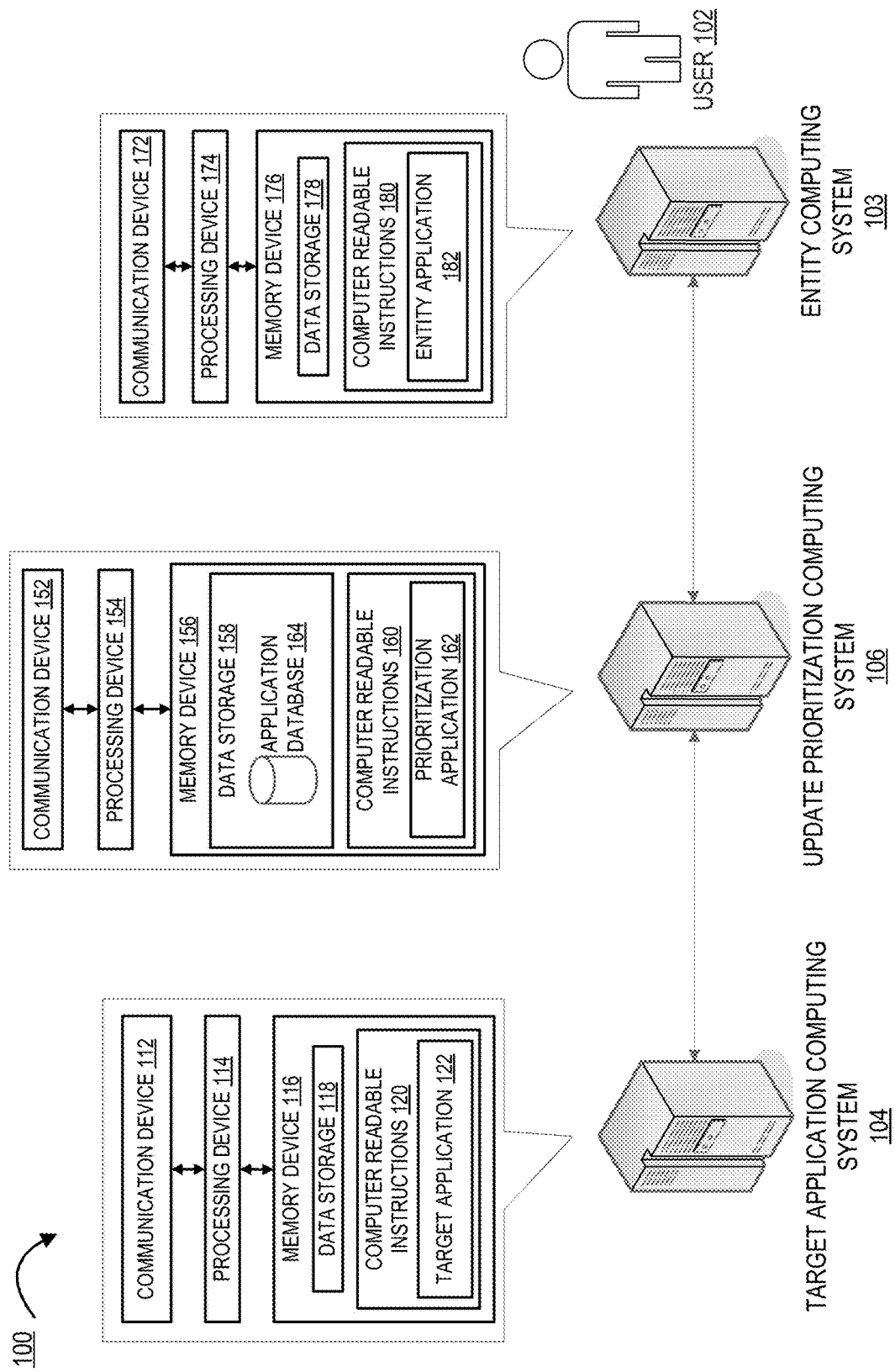
Figure 2:
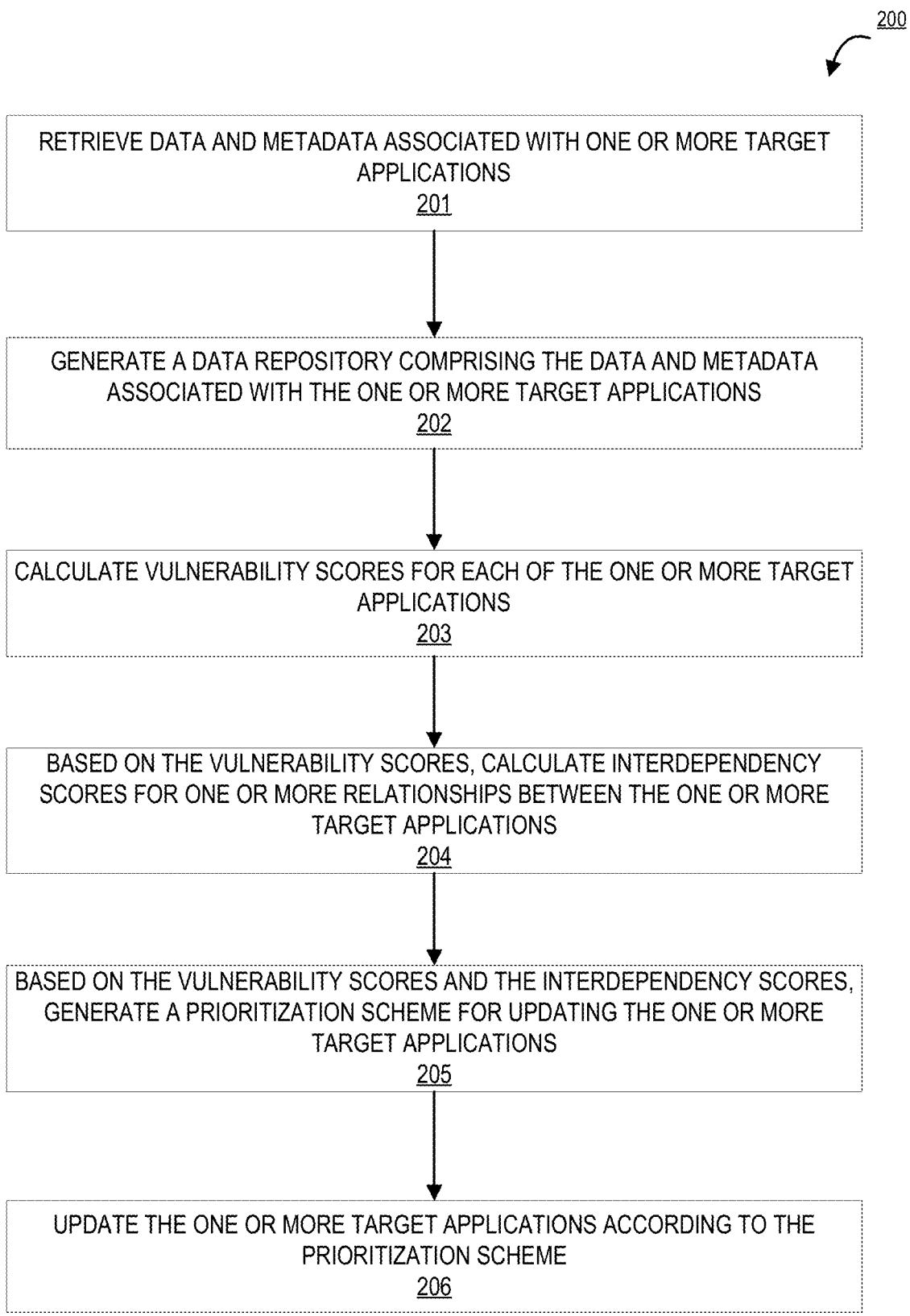

Having thus described embodiments of the invention in general terms, reference will now be made to the accompanying drawings, wherein:

FIG. 1 illustrates an operating environment for the update prioritization system, in accordance with one embodiment of the present disclosure; and FIG. 2 illustrates a process flow for the update prioritization system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any stationary or portable electronic device capable of receiving and/or storing data therein.

"Neural network" as referred to herein may refer to a network of computing nodes that use artificial intelligence and/or machine learning algorithms to accomplish certain tasks. Broadly, neural networks may be used for tasks requiring pattern recognition. For instance, a neural network may be constructed and used for the purposes of speech recognition, facial recognition, machine translation, or the like.

"Node" or "neuron" as used herein may refer to a functional unit within the neural network which may receive inputs, perform calculations based on the inputs, and produce outputs based on the calculations. In some embodiments, each node may be configured to produce an output only when the aggregated weighted inputs exceeds a certain threshold. Nodes may be structured such that some of the nodes receive inputs and/or outputs from other nodes. Based on the inputs received, the calculations performed on the inputs may change over time. For instance, a set of nodes may change the weights or biases for certain inputs based on learning algorithms (e.g., machine learning). In some embodiments, nodes may be arranged into layers, where each "layer" of nodes is configured to accomplish a specific task within the overarching objective of the neural network. Typically, the neural network comprises an input layer, and output layer, and one or more hidden layers in between the input layer and output layer, such that a neural network receives one or more signals through the input layer, at which point the signals propagates through the various layers of the neural network before reaching the output layer. Accordingly, in some embodiments, a neural network may itself be considered to be a node.

"Graph node" or "vertex" as used herein may refer to a functional data unit within a graph database, where the vertices may be connected to one another via "edges" or "lines" which establish certain defined relationships between vertices. For instance, a vertex labeled "server" may be connected to a vertex named "client" via an edge indicating that the server is configured to communicatively provide a resource (e.g., data) to the client. In some embodiments, the vertices and/or the edges may be associated with one or more "properties" which further add descriptive information to the vertices and/or edges.

Embodiments of the present disclosure provide a system for analyzing computer application vulnerabilities via multidimensional correlation and prioritization. In particular, the system (which may be referred to herein as the "update prioritization system") may be used to generate a prioritization scheme for deploying and/or validating updates, vulnerability patches, bug fixes, or the like for each application within a computing environment. A prioritization scheme may be necessary, for example, when certain applications are assigned higher priorities for updating than others. For instance, certain applications may be particularly vulnerable to certain software bugs and thus, if left unpatched, may be associated with a greater probability of negative operational impact to the applications or processes within the enterprise environment. Furthermore, certain applications may have specific uptime requirements (e.g., the application must remain online for a certain timeframe) such that the applications must be updated at specified maintenance periods. Yet another consideration may be the operational impact of an applied update on the various dependencies of an application (e.g., other applications which depend on the application to be updated, organizational processes depending on the application, or the like). Accordingly, the system may be configured to create an architecture to account for the various relationships and the interconnectedness of applications and processes within the computing environment.

In this regard, the system may separate applications into categories or tiers (which may be referred to herein as "tiering") based on various attributes of each application, such as functions performed, uptime requirements, application and/or process dependencies, or the like. To this end, the system may begin by generating a repository containing entries for each application within the computing environment as well as the attributes of each application as described herein. The repository may further contain detailed data regarding the relationships between the various applications and processes, which may in turn provide an understanding of the interconnectedness of said applications and processes. In some embodiments, data regarding relationships between the applications and processes may be stored within a graph database, where the defined applications and processes are stored as vertices while their associated relationships are stored as edges.

Once the repository is generated, the system may calculate vulnerability scores for each application, where the vulnerability score represents the potential impact (e.g., higher vulnerability scores may correlate with a higher probability of negative impact). Accordingly, the vulnerability score may reflect the effects of a disruption in application uptime (e.g., the downtime of the application itself along with any dependent applications or processes), the security threats posed by leaving the application unpatched, the effects of updates on the user experience, potential incompatibilities with related applications, or the like.

Based on the calculated vulnerability scores, the system may calculate an interdependency score based on the relationships of each application with other applications and/or processes in use within the computing network. In some embodiments, the system may examine the interdependency of applications along certain defined metrics and/or dimensions (e.g., analysis along five resource classes—users, devices, network, applications, and data). Certain relationships along certain dimensions may be assigned higher or lower weight values by the system to further increase the accuracy of prioritization. For instance, the relationship between an application that is highly dependent on another application may be assigned a higher weight value, while a relationship between an application that is less dependent on another application may be assigned a lower weight value.

Based on the various scores calculated in the previous steps (e.g., the vulnerability scores, the interdependency scores, weight values, or the like), the system may output a prioritization scheme may contain such information as which applications should be updated, the order in which the applications are updated, the timelines for updating each application, or the like. By using the prioritization scheme produced by the system described herein, an entity may be able to minimize the negative impact of the process of updating and/or patching the various applications in use within the enterprise environment.

In some embodiments, the system may use artificial intelligence and/or machine learning (e.g., via a neural network system) to improve the prioritization process over time. In this regard, the neural network system may continuously monitor the observed outcomes (e.g., historical data) for each prioritization scheme output by the update prioritization system. For instance, the neural network system may track and compare the predicted impact of the update on certain applications and dependencies against the observed impact of the update. Based on the historical data, the neural network may output one or more recommendations to modify the prioritization scheme. For instance, the neural network system may output recommendations to establish a new relationship (e.g., by detecting a correlation and/or impact between two previously unlinked applications or processes), adjust one or more calculated values (e.g., increasing a weight value of a relationship between applications based on detecting an impact on a dependent application which is greater than expected), changes to impact definitions (e.g., changes/additions to metrics for determining impact), or the like.

An exemplary use case is provided below for illustrative purposes. In one embodiment, an entity may implement a policy to upgrade all systems currently running Transport Layer Security (TLS) 1.0 to TLS 1.3 on or before a specified date (e.g., in response to a vulnerability found in the old protocol). That said, some applications may be more vulnerable to security threats than others. Meanwhile, some applications may have more dependencies which may be affected by the downtime caused by an update. By using the system described herein to generate a prioritization scheme, the system may provide a greater understanding of the interconnectedness of the applications to minimize the negative impacts of transitioning applications onto the new protocol.

The system as described herein confers a number of technological advantages over systems which use conventional methods of applying software updates. By defining in-depth relationships between applications and processes within a computing system, the update prioritization system may reduce the incidence of negative impacts of conducting the update (e.g., computing inefficiencies, application downtime and/or unavailability, workflow disruption, or the like). Furthermore, by processing real-world data using neural networks, the system may iteratively improve the prioritization scheme modeling process, thereby further reducing said negative impacts as the system becomes more effective over time.

Turning now to the figures, FIG. 1 illustrates an operating environment 100 for the update prioritization system, in accordance with one embodiment of the present disclosure. In particular, FIG. 1 illustrates an update prioritization computing system 106 that is operatively coupled, via a network, to a target application computing system 104 and/or an entity computing system 103. In such a configuration, the update prioritization computing system 106 may transmit information to and receive information from the target application computing system 104 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the update prioritization computing system 106 and the entity computing system 103 may be executed on a single computing system. Furthermore, a single system, device, or server as depicted in FIG. 1 may represent multiple systems, devices, or servers. For instance, the singular target application computing system 104 may represent multiple target application computing systems which may be communicatively coupled to the update prioritization computing system 106.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the update prioritization computing system 106 may comprise a communication device 152, a processing device 154, and a memory device 156. The update prioritization computing system 106 may be owned and/or operated by an entity such as an Internet service provider, financial institution, business organization, government agency, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the target application computing system 104 and/or the entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a prioritization application 162 which allows the entity system to perform various functions related to data characterization, tracking, management, and other related functions as described herein. In some embodiments, the memory device 156 includes data storage 158 for storing data related to the system environment, but not limited to data created and/or used by the prioritization application 162. In this regard, the data storage 158 may comprise an application database 164, which may include data and/or metadata associated with one or more target applications in use within the operating environment 100. The application database 164 may further comprise information regarding relationships between the various target applications (e.g., in the context of impacts of software updates). Accordingly, in some embodiments, the application database 164 may comprise a graph database in which the target applications are stored as vertices and the associated relationships are stored as edges.

The prioritization application 162 may comprise computer-executable program code which may instruct the processing device 154 to perform certain logic, data processing, and data storing functions of the application to accomplish the entity's objectives. For instance, the prioritization application 162 may receive input data and, based on the input data, produce an output with respect to a particular task assigned to the prioritization application 162 (e.g., detection of unauthorized users). In particular, the prioritization application 162 may gather data regarding the various target applications within the computing environment, calculate impact scores (e.g., vulnerability scores, interconnectedness scores, or the like), output prioritization schemes, and other processes as described herein. In some embodiments, the prioritization application 162 may further comprise a machine learning module comprising one or more neural networks, where the machine learning module is configured to continuously collect real-world data regarding the target applications and output recommendations on how to modify the prioritization schemes to reduce negative impacts on the target applications and their associated dependencies. In some embodiments, the target application computing system 104 may further comprise a neural network device which may include a hardware, software, or part hardware and software implementation of a neural network. Accordingly, the neural network may be a multilayer perceptron, Boltzmann machine, Markov chain, long/short term memory (LSTM), recurrent neural network (RNN), or the like. Accordingly, the prioritization application 162 may, through training and/or iterative processes, become increasingly effective at accomplishing the given task over a period of time.

As further illustrated in FIG. 1, the target application computing system 104 may be a computing system which is owned and/or operated by the entity for executing various processes to achieve the entity's objectives. In this regard, the target application computing system 104 may be, for example, a networked terminal, server, desktop computer, or the like, though it is within the scope of the disclosure for the target application computing system 104 to be a portable device such as a cellular phone, smart phone, smart device, personal data assistant (PDA), laptop, or the like. The target application computing system 104 generally comprises a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the update prioritization computing system 106 and/or the entity computing system 103. As such, the communication device 112 generally comprises a modem, antennae, WiFi or Ethernet adapter, radio transceiver, or other device for communicating with other devices on the network.

The target application computing system 104 comprises computer-readable instructions 120 and data storage 118 stored in the memory device 116, which in one embodiment includes the computer-readable instructions 120 of a target application 122. The target application 122 may comprise executable code portions for performing functions related to the various processes executed for the entity's purposes and objectives. It should be understood that while the target application computing system 104 is depicted as a single unit, the operating environment 100 may comprise multiple target application computing systems running multiple target applications. Accordingly, the prioritization application 162 may monitor the target application 122 and/or other target applications within the computing environment when determining the optimal prioritization scheme for updating the target application 122 and/or the other target applications. Furthermore, the application database 164 may store data and metadata regarding the target application 122 to be used in generating said prioritization scheme.

The operating environment 100 may further comprise an entity computing system 103. The entity computing system 103 may refer to a computing system which may receive output data from the update prioritization computing system 106 and execute one or more processes based on the output data. In some embodiments, the entity computing system 103 may be operated by a user 102 such as an administrator or employee of the entity. Accordingly, the entity computing system 103 may also comprise a processing device 174 operatively coupled to the communication device 172 and a memory device 176 comprising data storage 178 and computer readable instructions 180.

The computer readable instructions 180 may comprise an entity application 182 which may be configured to instruct the processing device 174 to execute certain functions over the network, such as interacting with the update prioritization computing system 106, application computing system 105, and/or the target application computing system 104. In particular, the entity application 182 may be used by the user 102 to access the prioritization scheme output by the prioritization application 162 and/or the data/metadata within the application database 164. Accordingly, the entity application 182 may, in some embodiments, implement the prioritization scheme by pushing updates to the various target applications 122 in accordance with the prioritization scheme.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for the update prioritization system, in accordance with some embodiments of the present disclosure. The process 200 begins at block 201, where the system retrieves data and metadata associated with one or more target applications. The target applications may include the various applications used by an entity within an enterprise environment to achieve its objectives. In one embodiment, the entity may wish to determine the most efficient method for updating the various applications (e.g., to comply with new security standards, implement new protocols or patches, address system vulnerabilities, or the like). In such an embodiment, the data and metadata associated with the one or more target applications may comprise the identity of the application (e.g., application name, type, function, or the like), technical information (e.g., compatibility information, O/S and/or platform support, version information, or the like), relationships to other applications and/or processes (e.g., library dependencies, dependent applications, impacts to business processes and/or services, or the like), and other types of data relevant to the potential impact caused from updating the target applications.

The process continues to block 202, where the system generates a data repository comprising the data and metadata associated with the one or more target applications. The data repository contain a catalog of all applications in use within the computing environment along with the data and metadata as described above. The data repository may further comprise information regarding all of the related and/or dependent applications, processes, and services for each application in use. In this way, the system may be able to identify the impacts of updates on not only the individual applications, but also the cascade of effects that may result from updating a particular application. In some embodiments, the data repository may comprise a graph database, where the various applications and processes are stored as vertices and the relationships between said applications and processes are stored as edges. In some embodiments, the graph database may be a multidimensional database which may allow the system to assign sub-properties (and/or n-th level properties) to the various properties of the vertices and/or edges.

The process continues to block 203, where the system calculates vulnerability scores for each of the one or more target applications. The vulnerability scores (or range of vulnerability scores) may serve as an indication of the potential negative impact as calculated by the system. The vulnerability scores may be quantified according to one or more industry standards for quantifying potential information threat events (e.g., FAIR). Accordingly, the vulnerability scores may be calculated based on factors such as the loss of application uptime, threat of data loss or breach, chance of update failure, chance of application and/or component incompatibility, or the like.

The process continues to block 204, where the system, based on the vulnerability scores, calculates interdependency scores for one or more relationships between the one or more target applications. The interdependency scores may be calculated along one or more predefined dimensions. For instance, in some embodiments, the predefined dimensions may be defined according to five resource classes (e.g., devices, apps, networks, data, and users). Accordingly, each relationship between applications and/or processes may be assessed based on the impact of an application update on devices (e.g., the workstations, servers, laptops, portable devices, IoT devices, network peripherals, or the like), applications (e.g., software applications, libraries, or the like), networks (e.g., the flow of online traffic and/or connections), data (e.g., information processed and/or stored by the system), and/or users who may interact with the affected applications. Accordingly, the system may generate separate interdependency scores for each dimension along which applications are compared (e.g., five interdependency scores may be calculated for each of the five resource classes). A high degree of relatedness and/or interconnectedness may correlate with a higher interdependency score, whereas a low degree of relatedness and/or interconnectedness may correlate with a lower interdependency score.

The process continues to block 205, where the system, based on the vulnerability scores and the interdependency scores, generate a prioritization scheme for updating the one or more target applications. The prioritization scheme may contain information regarding how an entity should structure its update schedule in anticipation of a potential loss event (e.g., data security breach, software compliance issue, or the like). Accordingly, the prioritization scheme may include instructions on the applications to be updated, timeframe or schedule of the updates, order of applications, the type of update to be applied (e.g., security updates, operating system updates, or the like), or the like.

The process concludes at block 206, where the system updates the one or more target applications according to the prioritization scheme. In some embodiments, the system may automatically implement the updates based on the prioritization scheme. Once the prioritization scheme has been implemented, the system may continue to track the effect of the updates on the target applications. For instance, the system may track various types of post-implementation data, such as the occurrence of service delays or outages, unexpected outcomes (e.g., software bugs, incompatibilities, or the like), performance issues, and the like. Based on such post-implementation data, the system may use a neural network system to generate suggestions or recommendations on tweaking the prioritization scheme (e.g., changes to scores or weights, definition of new relationships, changes to impact definitions, or the like). Through such a process, the system may continuously refine the prioritization process.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for analyzing and remediating computer application vulnerabilities via multidimensional correlation and prioritization, the system comprising:
    a memory device with computer-readable program code stored thereon;
    a communication device; and
    a processing device operatively coupled to the memory device and the communication device, wherein the processing device is configured to execute the computer-readable program code to:
        retrieve data and metadata associated with one or more target applications;
        generate a data repository comprising the data and metadata associated with the one or more target applications;
        calculate vulnerability scores for each of the one or more target applications;
        based on the vulnerability scores, calculate interdependency scores for one or more relationships between the one or more target applications;
        based on the vulnerability scores and the interdependency scores, generate a prioritization scheme for updating the one or more target applications; and
        update the one or more target applications according to the prioritization scheme, wherein the prioritization scheme comprises which of the one or more target applications should be updated, an order in which the one or more target applications are updated, and a timeline for updating the one or more target applications, wherein the prioritization scheme is generated based on a vulnerability of at least a portion of the one or more target applications and an uptime requirement of at least another portion of the one or more target applications.

2. The system according to claim 1, wherein the data repository comprises a graph database, wherein the one or more target applications are stored as vertices, wherein the one or more relationships are stored as edges.

3. The system according to claim 1, wherein calculating interdependency scores comprises assessing the one or more relationships along a set of predefined dimensions.

4. The system according to claim 3, wherein the set of predefined dimensions comprises measures of impacts to users, data, devices, software, and networks.

5. The system according to claim 1, wherein the computer-readable program code further causes the processing device to:

continuously monitor, via a neural network, historical data of outcomes of updating the one or more target applications according to the prioritization scheme;

compare the historical data of outcomes with predicted outcomes; and output one or more recommendations to modify the prioritization scheme.

6. The system according to claim 5, wherein the one or more recommendations to modify the prioritization scheme comprise changes to impact definitions, changes to the vulnerability scores or the interdependency scores, or newly suggested relationships between applications.

7. A computer program product for analyzing and remediating computer application vulnerabilities via multidimensional correlation and prioritization, the computer program product comprising at least one non-transitory computer readable medium having computer-readable program code portions embodied therein, the computer-readable program code portions comprising executable code portions for:

retrieving data and metadata associated with one or more target applications;

generating a data repository comprising the data and metadata associated with the one or more target applications;

calculating vulnerability scores for each of the one or more target applications;

based on the vulnerability scores, calculating interdependency scores for one or more relationships between the one or more target applications;

based on the vulnerability scores and the interdependency scores, generating a prioritization scheme for updating the one or more target applications; and updating the one or more target applications according to the prioritization scheme, wherein the prioritization scheme comprises which of the one or more target applications should be updated, an order in which the one or more target applications are updated, and a timeline for updating the one or more target applications, wherein the prioritization scheme is generated based on a vulnerability of at least a portion of the one or more target applications and an uptime requirement of at least another portion of the one or more target applications.

8. The computer program product according to claim 7, wherein the data repository comprises a graph database, wherein the one or more target applications are stored as vertices, wherein the one or more relationships are stored as edges.

9. The computer program product according to claim 7, wherein calculating interdependency scores comprises assessing the one or more relationships along a set of predefined dimensions.

10. The computer program product according to claim 9, wherein the set of predefined dimensions comprises measures of impacts to users, data, devices, software, and networks.

11. The computer program product according to claim 7, wherein the computer-readable program code portions further comprise executable code portions for:

continuously monitoring, via a neural network, historical data of outcomes of updating the one or more target applications according to the prioritization scheme;

comparing the historical data of outcomes with predicted outcomes; and outputting one or more recommendations to modify the prioritization scheme.

12. The computer program product according to claim 11, wherein the one or more recommendations to modify the prioritization scheme comprise changes to impact definitions, changes to the vulnerability scores or the interdependency scores, or newly suggested relationships between applications.

13. A computer-implemented method for analyzing and remediating computer application vulnerabilities via multidimensional correlation and prioritization, wherein the method comprises:

retrieving data and metadata associated with one or more target applications;

generating a data repository comprising the data and metadata associated with the one or more target applications;

calculating vulnerability scores for each of the one or more target applications;

based on the vulnerability scores, calculating interdependency scores for one or more relationships between the one or more target applications;

based on the vulnerability scores and the interdependency scores, generating a prioritization scheme for updating the one or more target applications; and updating the one or more target applications according to the prioritization scheme, wherein the prioritization scheme comprises which of the one or more target applications should be updated, an order in which the one or more target applications are updated, and a timeline for updating the one or more target applications, wherein the prioritization scheme is generated based on a vulnerability of at least a portion of the one or more target applications and an uptime requirement of at least another portion of the one or more target applications.

14. The computer-implemented method according to claim 13, wherein the data repository comprises a graph database, wherein the one or more target applications are stored as vertices, wherein the one or more relationships are stored as edges.

15. The computer-implemented method according to claim 13, wherein calculating interdependency scores comprises assessing the one or more relationships along a set of predefined dimensions.

16. The computer-implemented method according to claim 15, wherein the set of predefined dimensions comprises measures of impacts to users, data, devices, software, and networks.

17. The computer-implemented method according to claim 13, wherein the method further comprises:

continuously monitoring, via a neural network, historical data of outcomes of updating the one or more target applications according to the prioritization scheme;

comparing the historical data of outcomes with predicted outcomes; and outputting one or more recommendations to modify the prioritization scheme.

18. The computer-implemented method according to claim 17, wherein the one or more recommendations to modify the prioritization scheme comprise changes to impact definitions, changes to the vulnerability scores or the interdependency scores, or newly suggested relationships between applications.

* * * * *